United States Patent [19]

Bode et al.

[11] Patent Number: 4,609,706

[45] Date of Patent: Sep. 2, 1986

[54] HIGH SOLIDS COATINGS USING UNSATURATED MONOISOCYANATE ADDUCTS OF ALKYD RESINS

[75] Inventors: Daniel Bode, Cleveland; Henry J. DeGraaf, Stow, both of Ohio

[73] Assignee: SCM Corporation, New York, N.Y.

[21] Appl. No.: 716,699

[22] Filed: Mar. 27, 1985

[51] Int. Cl.$^4$ .................. C08L 67/08; C08L 33/08
[52] U.S. Cl. ............................. 525/7.4; 525/7; 525/28; 525/111; 525/127; 525/278; 525/454; 525/455; 525/528; 526/301
[58] Field of Search .......... 525/7, 7.4, 28, 10, 525/528, 440, 127, 920, 454, 278, 111, 455; 526/301

[56] References Cited

U.S. PATENT DOCUMENTS

| | | | |
|---|---|---|---|
| 3,448,172 | 6/1969 | Damusis | 525/920 |
| 4,360,653 | 11/1982 | Stevens | 526/301 |
| 4,421,894 | 12/1983 | O'Connor | 525/28 |
| 4,524,178 | 6/1985 | Hefner | 525/46 |

*Primary Examiner*—Wilbert J. Briggs, Sr.
*Assistant Examiner*—Patricia Short
*Attorney, Agent, or Firm*—A. Joseph Gibbons; Thomas M. Schmitz

[57] ABSTRACT

High solids alkyd resin coatings are prepared by reacting at least a portion of the available hydroxyl groups on a resin with an ethylenically unsaturated monoisocyanate monomer. The new products, useful both as the major vehicle resin in high solids coatings and as a cure modifier for oxidatively curable alkyd, polyester and acrylic resins, impart improved drying and weathering properties to coatings while maintaining low paint viscosity.

10 Claims, No Drawings

HIGH SOLIDS COATINGS USING UNSATURATED MONOISOCYANATE ADDUCTS OF ALKYD RESINS

The invention relates to improved high solids coatings prepared from novel low molecular weight unsaturated urethane containing polymers used either as the major resin component or as a cure modifier for alkyd, polyester, or fatty acid modified acrylic resins.

BACKGROUND OF THE INVENTION

Recent efforts of the coatings industry directed at the problem of volatile organic emissions of organic coatings have promoted the use of vinyl or acrylate monomers as reactive diluents. Reactive diluents are described by Emmons, *Chemistry of High Solids Alkyd/Reactive Diluent Coatings*, Jr. Coatings Technology 55, No. 702, July 1983, and in U.S. Pat. Nos. 4,014,830; 4,097,677; 4,145,503; 4,178,425; and 4,224,202. While the reactive diluent technology provides reduced solvent emission and high solids coatings, such systems have the disadvantage of slow dry and film cure on application. U.S. Pat. No. 4,304,883 (1981 to Hitachi) claims an unsaturated polyester resin composition prepared from dicyclopentadiene modified unsaturated alkyds (polyesters) containing allyl ethers and dissolved in a polymerizable vinyl monomer (styrene) and cured in the presence of air with organic peroxides.

Attempts to reduce the VOC content of alkyd paints via lower molecular weight and glass transition temperature (which give low VOC) have been shown to increase the film dry time. Other methods such as by incorporating benzoic acid are deceptive in that only a lacquer type dry results. In addition to film dry, it is desired to achieve solvent resistance, mechanical properties and weatherability. These and other advantageous properties result for the improved alkyd resins of the instant invention.

BRIEF SUMMARY OF THE INVENTION

Briefly the invention relates to improved alkyd type coatings and particularly to high solids coatings based on uralkyd polymers which serve as the principal resin component in coatings and paints and which cure largely by oxidative mechanism.

The improved polymers comprise the reaction product of:
- a low molecular weight hydroxylated oligomer or polymer selected from the group consisting of alkyd, acrylic, polyester, urethane, polyether, polyepoxide, and mixtures thereof; and
- a bifunctional reactive monomer containing both an ethylenically unsaturated moiety and at least one isocyanate functionality; wherein said product has a number average molecular weight from about 400 to 1600, and contains an average of from about 0.2 to about 3 ethylenically unsaturated groups per mole and less than 0.1% by weight free isocyanate groups.

The uralkyd oligomers are preferably used as the main resin component and enhance the dry time and weatherability properties of paints formulated therewith.

A further aspect of the invention involves the use of the improved uralkyd oligomers as cure additives in various paint systems, particularly oxidatively crosslinkable alkyd, polyester, and acrylic resins.

DETAILED DESCRIPTION OF THE INVENTION

Alkyd resins derived from unsaturated fatty acid or unsaturated oils provide coatings with drying and semidrying characteristics. It is known that alkyd and polyesters having hydroxy functionality can be reacted with isocyanates and polyisocyanates to form resins having urethane linkages i.e.

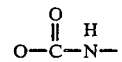

Isocyanate-modified alkyd resins are often called "uralkyds" and isocyanate-modified drying oils are called "urethane oils". U.S. Pat. No. 3,928,299 (Rosenkranz et al) teaches high molecular weight polymers which contain urethane groups and crosslink by light induced vinyl or vinylidene polymerization.

In constrast, the improved polymers of the instant invention cure by an oxidative mechanism either at the carbon-carbon unsaturated bonds in the polymer (derived from unsaturated fatty acids) and at the unsaturation in the pendant urethane position. Such cures are effected at from ambient temperatures to above 160° C. and can often be accelerated by a metal drier or siccative. In this manner the instant polymers supply sufficient cure sites to enhance the oxidative cure of the high solids coatings formulated therefrom. The term "polyester" as used herein generally refers to condensation products of one or more polyols with mono and polybasic acids. The term "alkyd resin" as used herein specifically includes unsaturated fatty acid modified polyester and excludes unsaturated polyesters wherein the unsaturation results largely from an unsaturated diacid or anhydride such as maleic, fumaric and the like.

The alkyd polymers of the instant invention are useful as the major resin vehicle in coatings and paints, particularly high solids coatings, as exemplified in Examples 1–10. In such cases it is preferred that the alkyd polymer constitutes more than 50 percent of the resin vehicle and preferably 75–100 percent thereof.

A second aspect, also contemplated within the scope of this invention, is the use of the uralkyd polymers as cure modifiers for other resin systems in which case they are incorporated with other coating vehicles at concentrations of less than 50 weight percent (basis total resin) and more aptly in the range of from 5 to 40 weight percent. Use as a cure modifier is exemplified in Examples 11–13. Various ethylenically unsaturated monomers having one or more reactive isocyanate groups can be reacted with a variety of polymers to produce the uralkyds of the present invention. As noted herein the term "uralkyd" includes hydroxylated polymers generally which have been modified by reaction with an isocyanate monomer to produce urethane bonds within the polymer. The term as used herein also includes both isocyanate-modified alkyd resins and drying oil alkyds.

Both aspects of the invention utilize polymers obtained by reacting a bifunctional reactive monomer containing an ethylenically unsaturated moiety and an isocyanate functionality with a hydroxyl functional alkyd, polyester, acrylic, urethane polyester, polyether, polyepoxide or mixtures thereof. Such products have a number average molecular weight from about 400 to 1600 and contain from about 0.2 to about 6 ethylenically unsaturated groups per molecule and less than 0.1% by weight free isocyanate groups. When used for blending purposes, the modifiers preferably have a number average molecular weight from 400–1200. When used as the sole or major resin vehicle, the urethane polyester polymer will preferably have a number average molecular weight of 800–1200, and contain an average of about 0.5 to 1.0 ethylenically unsaturated groups. Drying oil alkyds are preferred reactants with the isocyanate. Preferred compositions are reaction products of polyols, polybasic acids, polybasic unsaturated acids, glycols and monobasic acids. A wide variety of such hydroxy functional alkyd and polyesters are known. While it is possible to simultaneously coreact the ester components with the unsaturated isocyanatoalkyl monomer, it is much preferred to synthesize the hydroxy-containing oligomer or polymer and thereafter add the isocyanate to form the urethane polyester (uralkyd).

Useful isocyanates for forming such urethane-containing polymers include vinyl isocyanates, isocyanatoalkyl acrylates and methacrylates and a variety of aryl or aralky isocyanates. Specific isocyanates include vinyl isocyanate, isopropenyl isocyanate, isocyanatoethyl and isocyanatopropyl acrylates and methacrylates. The aryl and aralkyl compounds include, for example, vinylbenzyl isocyanates, isopropenylbenzyl isocyanates, vinylaryl isocyanates such as vinylphenyl and isopropenylphenyl isocyanates and the like. Isopropenylphenyl isocyanates and isopropenylbenzyl isocyanates can be prepared by known methods including U.S. Pat. Nos. 3,654,336; 4,379,767; 4,399,074; 4,399,073; and 4,439,616. The most preferred monomer is meta-isopropenyl-, -dimethylbenzyl isocyanate.

Examples of diols and polyols useful in the preparation of the instant oligomers include ethylene glycol, propylene glycol, diethylene glycol, dipropylene glycol, neopentyl glycol, 1,3 butylene glycol, 1,6 hexanediol trimethyl pentanediol, cyclohexanedimethanol, glycerin, trimethylolethane, trimethylolpropane and pentaerythritol. Other useful polyols includes, for example, vinyl-allyl alcohol copolymers, epoxy resins, polyether polyols or urethane diols or polyols.

Examples of dibasic acid or anhydrides include phthalic, isophthalic, adipic, succinic, suberic, azelaic, maleic, fumaric, terephthalic, glutaric, itaconic and the like. These may be combined with fatty acids, benzoic acid and other monobasic acids. Additionally oils and fatty acids, such as for example, tall, safflower, soya, linseed, sunflower and the like may be used in the oligomer preparation for preparing drying oil alkyd resins.

The paints contemplated in the present invention do not contain vinyl type monomers such as styrene, which actively participate in the cure mechanism via a vinyl type polymerization cure. The instant paint formulations may, however, include a metal salt oxidative cure accelerator such as, for example, cobalt, copper, zinc, and manganese naphthenates.

The use of other additives known to the art including stabilizers, pigments, fillers, bodying agents, biocides, and thickners and the like are contemplated in forming high solids coatings and paints. A typical high solids air drying paint formulation includes other components, such as, stabilizers (butanone oxime) and dispersing agents. The coating is applied to phosphatized metal and air dried at ambient temperature. The coating is examined for dry and water spot resistance on an hourly basis the first day.

Viscosity

Viscosity is evaluated using a fixed volume Zahn cup having a precision drilled orifice. The time required for a completely filled cup to drain via the bottom orifice is reported in seconds.

Drying Time

Dry time can be evaluated by two different methods. Surface dry is said to occur when the coating film feels dry and is tack-free. Acceptable times for tack-free dry differ depending on the drying temperature used.

A second evaluation is hard dry. Hard dry occurs when no print is left by exerting moderate pressure with the thumb.

Weathering (Procedure for)

Florida: Panels are exposed in South Florida at a 45° angle toward the south. Panels are cleaned and gloss measurement taken at three-month intervals.

Weatherometer: Test panels are placed in a weatherometer cabinet and exposed to water spray for 18 minutes/hr. while temperature is maintained at 145° F.

Cleveland Condensing Humidity Test

Gloss and color change are measured after a given time period in the CCH cabinet operating at 60° C. under continued condensation conditions.

The reactive vehicles and cure modifiers of the present invention, utilizing polymers reacted with specific monomers containing both an ethylenically unsaturated and isocyanate functionality, eliminate a number of disadvantages of prior art alkyd coatings and contribute to improved gloss, hardness and viscosity characteristics of said coatings.

When used as a cure modifier, unsaturated urethane polymers are combined by blending with the primary film forming resin, i.e. alkyd or acrylic resin containing unsaturated fatty acids, in amounts ranging from about 5 to about 50 and preferably 10 to 30 weight percent basis primary film former. Other additives, resins, reactive monomers, diluents, pigments, fillers, etc., known to the art can be used to develop desirable film forming and coating properties. Paints formulated from compositions of the instant invention may be applied to metal or wood substrate by usual techniques including brush coating, spray coating, flow coating, roll coating, electrostatic coating, and the like. Such paints are particularly useful in coating off-road vehicles such as farm implements or construction equipment.

The applied coatings of this invention readily cure in air at temperatures ranging from ambient to above 160° C. and are to be distinguished from other polymer systems which cure by free radical polymerization either internally or with external monomers, i.e. styrene. Metal driers, in the form of polyvalent metal salts or complexes of organic acids, and known in the coatings trade, are useful to accelerate the oxidative cure of the unsaturated drying oil modified alkyd, polyester or acrylic polymer. Cobalt or manganese naphthenates or octoates are primary examples of driers serving this function. Other auxiliary driers are also used in combination with cobalt or manganese to promote faster hardness development and early water resistance. Examples are the metal salts of calcium, zirconium, potassium, iron, zinc, copper or lead. Drier accelerators such as 1,10 phenanthroline are often used along with the metal driers to improve dry performance. Other useful additives for the instant coatings include volatile stabilizers such as methylethyl ketoxime and are useful and necessary to prevent polymerization or skinning of paints or resin mixtures in containers or storage tanks prior to application.

The following exemplary examples which illustrate the invention should not be read in a restrictive manner. Unless otherwise indicated, temperatures are given in degrees Centigrade and percentages are expressed as weight percentages.

EXAMPLES 1–4

Drying oil alkyd resins were prepared from the following components:

| Example No. | 1 | 2 | 3 | 4 |
|---|---|---|---|---|
| Sunflower Oil | 863 | 1044 | 1046 | 1046 |
| Trimethylolethane (TME) | 432 | 546 | 560 | 560 |
| Isophthalic Acid (IPA) | 900 | 1168 | 833 | 833 |
| Propylene Glycol (PG) | 170 | 193 | 145 | 145 |
| Pamolyn 200 Fatty Acid (P-200) | 280 | 440 | 440 | 350 |
| Pentaerythritol (PE) | 200 | 10 | 46 | 50 |
| Phthalic Anhydride (PA) | 165 | — | 300 | 300 |
| Benzoic Acid (BA) | 400 | — | — | — |

The drying oil is heated with a portion of the TME for 30 minutes at 230°–240° C. in the presence of *Lithium* (*Ten Cem*) catalyst* (Mooney Chemicals) to promote transesterification. The remaining TME, IPA, and PG are added. Batch is heated (235° C. max.) and water removed until acid number is in the range of 15–30.

The remaining monomers are added below 200° C. Batch is heated (max. 246° C.) and water removed until final end point, acid number 6–9, is reached. Batch is cooled and reduced to 70–80% solids in xylene.

EXAMPLES 5–8

The products of Examples 1, 2, 3, and 4 were respectively further reacted with 266, 266, 264 grams and 416 grams meta isopropenyl-α,α-dimethylbenzyl isocyanate (m-TMI) by adding m-TMI at 132° C., allowing to cool to 120° C. and holding 120° C. temperature for 2 hours. The urethane alkyds corresponding to Examples 1, 2, 3, and 4 polyester alkyds were identified as Examples 5, 6, 7, and 8, respectively.

EXAMPLE 9

The alkyds of Examples 1 through 8 (except 4) were formulated into a yellow paint using the following recipe to give a pigment/binder ratio of 0.55/1.0.

|  | Wt. Ratio | % |
|---|---|---|
| Alkyd | 32 | 11.4 |
| Titanium Dioxide Pigment | 20 | 7.1 |
| Yellow Iron Oxide Pigment | 35 | 12.5 |
| Butyl Acetate | 15 | 5.3 |
| Alkyd | 96 | 34.2 |
| Methyl Isobutyl Ketone | 55 | 19.6 |
| Methyl Ethyl Ketoxime | 0.70 | 0.2 |
| Zirconium Drier (12% Zirconium CEM-ALL*) | 1.67 | 0.6 |
| Potassium Drier (15% Potassium HEX-CEM*) (Octoate) | 1.33 | 0.5 |
| Cobalt Drier (12% Cobalt CEM-ALL) | 0.83 | 0.3 |
| Activ-8 (R. T. Vanderbilt Co. 1,10-phenanthroline) | 1.05 | 0.4 |
| Xylene | 22 | 7.8 |

*Trademarks of Mooney Chemicals

EXAMPLE 10

The paints of Example 9 were evaluated for viscosity (Zahn #2 cup), pencil hardness, tack-free drying time, through dry time, loss of gloss 20° and 60° (Florida weathering), Weather-O-Meter and by the Cleveland Condensing Humidity Test. Comparision results with respect to identical drying alkyds not modified with the m-TMI reactant are shown in Table I. The polymers of Examples 5 through 8 show improved dry time, viscosity (lower), and gloss retention.

TABLE I

| Example No. | m-TMI Modified | Viscosity* (Zahn #2) | Pencil Hardness | Dry Time (hrs.) Tack Free | Weathering (6-Mos. Fla.) 20° | 60° | Weather-O-Meter (hrs.) 20° Gloss 0 | 225 | 312 | 405 | 496 | Cleveland Condensing Humidity (0/168 hrs. @ 60°) 20 | 60 | ΔE |
|---|---|---|---|---|---|---|---|---|---|---|---|---|---|---|
| Ex. 5 | Yes | 29 | B | 1¼ | 70 | 90 | 91 | 79 | 80 | 80 | 79 | 89/40 | 95/77 | 0.63 |
| Control Ex. 1 | No | 40 | B | 2¼ | 61 | 88 | 89 | 60 | 64 | 68 | 70 | 87/15 | 94/60 | 0.63 |
| Ex. 6 | Yes | 64 | — | 1.25 | | | | | | | | | | |
| Control Ex. 2 | No | 85 | — | 1.45 | | | | | | | | | | |
| Ex. 7 | Yes | 34 | B | 2½ 3¼** | | | | | | | | | | |
| Control Ex. 3 | No | 42 | 2B | 3½ 4 | | | | | | | | | | |

TABLE I-continued

| Example No. | m-TMI Modified | Viscosity* (Zahn #2) | Pencil Hardness | Dry Time (hrs.) Tack Free | Weathering (6-Mos. Fla.) 20° | 60° | Weather-O-Meter (hrs.) 20° Gloss 0 | 225 | 312 | 405 | 496 | Cleveland Condensing Humidity (0/168 hrs. @ 60°) 20 | 60 | ΔE |
|---|---|---|---|---|---|---|---|---|---|---|---|---|---|---|
| Ex. 8 | Yes | 58 | B | 1¾ 2 1/10 | | | | | | | | | | |

*Viscosity in seconds
**Through Dry

EXAMPLE 11

A polyester urethane cure modifier was prepared as follows:

| Components | Weight (Grams) | Moles |
|---|---|---|
| 1,6 Hexanediol | 300 | 2.54 |
| Trimethylol ethane | 366 | 2.95 |
| Isophthalic acid | 446 | 2.68 |
| Benzoic acid | 320 | 2.62 |
| m-TMI | 552 | 2.74 |
| Isophorone diisocyanate | 76 | 0.34 |

Hexanediol and trimethylol ethane were melted in a resin kettle and heated to 145° C. and the isophthalic acid was added. The mixture was heated under nitrogen to 210°-238° C. and held for 50-70 minutes removing water of esterification (97-100 ml), acid number of about 25.8. The monobasic acid was then added (at 202° C.) and batch re-heated to 196°-241° C. while water of esterification was removed. Batch is cooked, with xylene axeotrope added (20-32 grams) to assist in water removal, until an acid number of 7.2 was reached. Batch was then cooled, excess xylene removed, and scaled down (460 g batch removed) to 64% for convenience. Then α,α-dimethyl meta isopropenyl benzyl isocyanate (m-TMI) was added (354 g-scaled down) at 100° C. and batch heated to 120°-130° C. holding for 1½ hrs. (NCO test <0.1%). Later isophorone diisocyanate was added to increase the viscosity (molecular weight). Xylene was also added during processing to assist in cooling the batch and help to keep sides of flask clean. Two hours additional heating at 90° to 115° C. brought NCO level down to less than 0.01%. Additional xylene was added to reduce final batch to 79.4% solids. Final acid number: <4.0; Viscosity: 5.6 poise T+@70.4% NV in xylene; Calcd. molecular weight: 760 (No. Average).

Clears were formulated from the cure modifier of Example 11 by blending the following components:

| Ingredient | N.V. | Weight in Grams Blend | Control |
|---|---|---|---|
| Alkyd Resin* | 98.0 | 126.3 | 22.6 |
| Cure Modifier: (Example 11) | 42.0 | 52.9 | — |
| Xylene | | 20.8 | 4.46 6.86 |
| | | 200.0 | 25.0 — |
| Drier Mix** | | 0.76 | 0.76 |
| | | TOTAL 30.22 | 30.22 |

*Medium oil alkyd based on safflower oil and refined tall oil fatty acid.
**12% Cobalt CEM-ALL 2.5; 12% Zirconium CEM-ALL 5.0; 15% Potassium HEX-CEM 4.0; butanone-2 oxime 1.60 (grams).

The clears were tested using a BK Drying Recorder with 16 grams weighted needles drawn across the coating over a 24-hr. period. The clears incorporating the modifier of Example 11 showed good hardness development equal to that of the control.

EXAMPLE 12

A polyester urethane cure modifier was prepared as follows:

| | Components | Weight (Grams) | Moles |
|---|---|---|---|
| | 1,6 Hexanediol | 142 | 1.20 |
| A | Neopentyl Glycol | 480 | 4.61 |
| | Isophthalic acid (IPA) | 480 | 2.89 |
| B | Hydrogenated bisphenol A (HBPA) | 240 | 1.00 |
| | Maleic anhydride | 428 | 4.37 |
| | Trimethylol ethane (TME) | 212 | 1.71 |
| C | Lauric acid | 284 | 1.42 |
| E | m-TMI | 285 | 1.42 |
| F | Xylene | 300 | |
| B | Piperidine | 2.0 | |
| C | Toluene } ADDITIVES | 30.0 | |
| D | Xylene | 400.0 | |
| | Ionol | 6.0 | |
| E | Dibutyl tin dilaurate | 6 drops | |

Hexanediol and neopentyl glycol were melted in a resin kettle and heated to 95° C. and the isophthalic acid was added. The mixture was heated under nitrogen to 205°-220° C. and held for 50-70 minutes removing water of esterification (77-95 ml) to acid number of about 25. The HBPA was then added (at 176° C.) while the batch was cooled to <150° C.

Add maleic anhydride when temperature is below 140° C.; follow with piperidine. Hold 125°-130° C. (cool if necessary) until exotherm is over (10-15 minutes). Add (C): gain reflux (head temperature 95°-100° C.) and hold (max. batch temperature 232° C.) removing water thru column until head temperature drops below 95° C. Remove column and attach Dean-Stark water trap using toluene or xylene axeotrope. Continue process and hold for acid number 10 or less, adding toluene (C) to batch as required. Cool to 132° C. or less and add (E), hold 1-2 hours at 120°-125° C., cool (add xylene to assist) to 85° C. blending in reducing solvent (F) to give a non-volatile content to 75.9% viscosity Z4 (66 poise) and acid number 6.0 (sol'n). calculated molecular weight is 1050 (number average).

EXAMPLE 13

The procedure of Example 12 was repeated using the following formulation:

| Component | Weight (Grams) | Moles |
|---|---|---|
| Trimethylol propane | 302 | 2.25 |
| Trimethylol ethane | 336 | 2.71 |
| Isophthalic acid | 450 | 2.71 |
| Benzoic acid | 380 | 3.11 |

-continued

| Component | Weight (Grams) | Moles |
|---|---|---|
| m-TMI | 950 | 4.72 |

Trimethylol propane was melted in a 3-liter flask and heated to 95° C. where trimethylol ethane was added and the mixture heated to 160° C. where the isophthalic acid was added. The mixture was heated under nitrogen to 212°–230° C. and held for 50 minutes removing water of esterification (93–100 ml). The monobasic acid is then added. The process is continued at 216°–239° C. removing water, assisted by the addition of 10–30 grams of xylene. Batch is cooked at 232°–239° C. for 2.5–3.0 hours until an acid number of 5.5 was reached. Batch was cooled to 92°–105° C. where m-TMI monomer was added. Batch (½ scale) was then heated to 120° C. and held for 50–60 minutes at 114° to 122° C. Additional xylene (200 grams ½ scale) was added for cooling and processing ease. Final batch was reduced to 75% solids in xylene. Viscosity of this solution was 60 poise (Z4 Gardner Holt). Calcd. molecular weight: 960 (No. Average).

The composition of Examples 12 and 13 were blended as cure additives with a medium oil alkyd at 26% and 30% by weight modifier levels.

EXAMPLE 14

Clears were formulated from the cure modifier of Examples 12 and 13 by blending the following components and were identified as 12A and 13A, respectively:

| Ingredient | N.V. | Weight in Grams | | |
|---|---|---|---|---|
| | | 12A | 13A | (Control) |
| Alkyd Resin* | 13.3 | 19.0 | 19.0 | 25.7 |
| Cure Modifier: grams | 4.7 | 6.3 | 6.2 | — |
| Xylene | — | 4.7 | 4.8 | 4.3 |
| Drier Mix** | | 0.46 | 0.46 | 0.46 |

*Medium oil alkyd based on safflower oil and refined tall oil fatty acid.
**12% Cobalt CEM-ALL 2.5; 12% Zirconium CEM-ALL 5.0; 15% Potassium HEX-CEM 4.0; butanone-2 oxime 1.60 (grams).

The glass plate clears were tested using a BK Drying Recorder with 16 grams weighted needles drawn across the coating over a 24–48-hr. period at a temperature of 72°–74° F. and relative humidity of 66–75%. Test results are shown in the following table:

| Experiment No. | Thru Dry (hrs.) | |
|---|---|---|
| | Cut Narrows | Last Cut |
| 12A | 22 | 40 |
| 13A | 8 | 22 |
| (Control) | 11.5 | >43 |

The clears prepared by blending modifiers of Examples 12 and 13 showed equal or improved hardness compared to the control.

What is claimed is:

1. An oxidatively curable coating composition comprising a film-forming drying oil modified alkyd or acrylic resin and from about 5 to about 40 weight percent basis said resin of a cure modifier which comprises the reaction product of
   (a) an oligomer or polymer selected from the group consisting of acrylic, polyester, urethane, polyether, and polyepoxide, said oligomer or polymer having hydroxyl functional groups adapted to react with an ethylenically unsaturated isocyanate monomer as set forth in (b) to form appendages having both urethane linkages and ethylenical unsaturation; and
   (b) a bifunctional reactive monomer containing both an ethylenically unsaturated moiety and one isocyanate functionality; said monomer selected from the group consisting of unsaturated aralkyl isocyanate, isocyanatoalkyl acrylate, and isocyanatoalkyl methacrylate;

wherein said product has chain appendages having both urethane and ethylenic unsaturation, has a number average molecular weight from about 400 to 1,600 and contains from about 0.2 to 6 ethylenically unsaturated groups per mole and less than 0.1% by weight free isocyanate groups.

2. The composition of claim 1 wherein the oligomer is a polyester resin.

3. The composition of claim 2 wherein the bifunctional monomer is an unsaturated aralkyl isocyanate.

4. The composition of claim 3 wherein the bifunctional monomer is meta-isopropenyl-alpha,alpha-dimethylbenzyl isocyanate.

5. The composition of claim 2 wherein the oligomer is an alkyd resin.

6. A substrate coated with the composition of claim 1.

7. A high solids oxidatively curable coating composition which comprises as the principal resin component at least 50 weight percent of the reaction product of
   (a) a low molecular weight drying oil alkyd having hydroxyl functional groups adapted to react with an ethylenically unsaturated isocyanate monomer as set forth in (b) to form appendages having both urethane linkages and ethylenical unsaturation; and
   (b) a bifunctional reactive monomer containing both an ethylenically unsaturated moiety and one isocyanate functionality; said monomer selected from the group consisting of unsaturated aralkyl isocyanate, isocyanatoalkyl acrylate and isocyanatoalkyl methacrylate;

wherein said product has a number average molecular weight of from about 400 to 1,600, and contains from about 0.2 to 6 ethylenically unsaturated groups per mole and less than 0.1% by weight free isocyanate groups.

8. The composition of claim 7 wherein said composition is a resin reacted with an unsaturated aralkyl isocyanate and wherein said alkyd resin has a number average molecular weight of from about 800 to about 1600.

9. The composition of claim 8 wherein the isocyanate is metaisopropenyl-alpha,alpha-dimethylbenzyl isocyanate.

10. A substrate coated with the high solids composition of claim 9.

* * * * *